Figure 1:
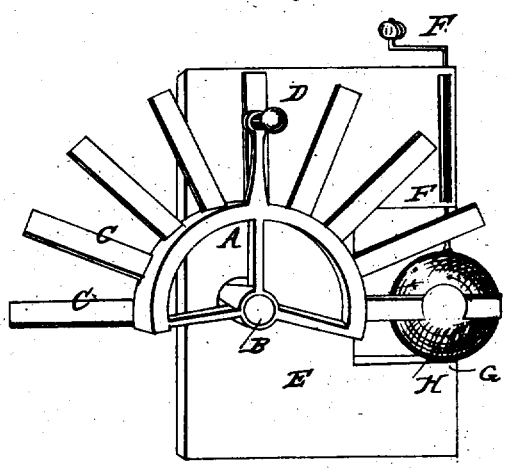
Figure 2:
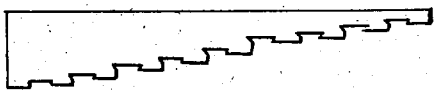

8074X

D. DAVIS, 2d.

Apple Slicer.

Patented March 13, 1834.

NO PRINTED COPY OF SPECIFICATION IN OFFICE.

Daniel Davis, 2d. of Stafford, Connecticut.

Letters Patent.

8074X

The schedule referred to in these Letters Patent and making part of the same containing a description in the words of the said Daniel Davis 2d.. himself of his improvement in the machine for slicing Green Apples preparatory to Drying.

To all to whom these presents shall come;

Be it known that I Daniel Davis 2d. of Stafford in the County of Tolland & State of Connecticut, have invented a new and useful machine, for cutting or slicing green apples. preparatory for drying & that the following is a full & exact description of the construction & operation of the said machine as invented by me to wit. 1st. A plank or standard of wood about two inches thick about 12 inches in length & about 10 inches wide, of sufficient strength to hold the axle on which the machine moves, having a place or opening on the right side about 4 inches in height and about 2 inches wide in which the apple is to be placed for slicing, which standard may be placed in a vice or nailed perpendicularly to any fixed substance, & is represented in the annexed drawing by the letter C.

2d. A semicircular metallic wheel, or casting having a rim half an inch wide with a handle about 6 inches long from the hub of the wheel, by which the wheel is turned, said wheel to be about 6 inches in diameter, with three shafts or more or less connecting the rim with the hub. with a box in the centre, to pass the wheel on the axle in the standard to have 9 grooves or dovetails (or more or less as necessity may require) on its circumference the knives are placed, on the side of the semicircle which faces the standard, the grooves or dovetails are about 1/2 an inch apart & about 1/6 of an inch forward of each other which gives the thickness of the slice of apple & is represented in the annexed drawing by letters A. & D. & by the horizontal profile of the rim of said wheel, marked in said drawing No. 2.

3d. Nine knives or metallic blades (or more or less as necessity may require) about 3½ inches long and about 3/4 of an inch wide are to be inserted in the grooves or dovetails in said wheel, and are represented in the annexed drawing by letters C, C.

4th. An axle of wood or metal about 4 inches long to be inserted

PH

8074X in the standard upon which the machine is to revolve, marked in the annexed drawing by the letter B.

5th. A metallic fork about 6 inches long with four tines at one end and a crank about 2 inches long with a pivot at the other end, upon which the apple is to be placed the fork is attached to the right side of the standard and moves in a groove secured by staples the crank reaches above the standard and is represented in the annexed drawing by letter F. —

6th. A round pin or pivot about 3/4 of an inch long to be placed in the right side of the standard at the bottom of the spring upon which the apples is to be placed for slicing and around which it revolves as a centre and is marked in the annexed drawing by letter G.

Operation.

The apple is placed upon the pin or pivot for slicing the left hand takes hold of the crank of the fork and with the right hand the wheel is put in motion, a single revolution of the wheel, slices off one third part of the apple, the crank is then turned so as to bring forward another third part of the apple which a second revolution of the wheel slices off in like manner, the crank is again turned & brings forward the remaining part of the apple, & a third revolution of the wheel slices off the remainder of the apple, in like manner.

Witnesses
Walter R. Kibbe
H. Sophia Kibbe

Daniel Davis 2d

Drawing

Exd
Chff.

720 [illegible]